United States Patent
Klees et al.

(10) Patent No.: US 6,407,767 B1
(45) Date of Patent: Jun. 18, 2002

(54) APPARATUS FOR EXPOSING SENSITOMETRIC AND BAR CODE DATA ONTO PHOTOSENSITIVE MEDIA

(75) Inventors: Kevin J. Klees, Hamlin; Thomas F. Powers, Webster; Craig A. Caprio; Mitchell L. Wright, both of Rochester; Donald O. Bigelow, Webster, all of NY (US)

(73) Assignee: Eastman Kodak Company, Rochester, NY (US)

( * ) Notice: Subject to any disclaimer, the term of this patent is extended or adjusted under 35 U.S.C. 154(b) by 57 days.

(21) Appl. No.: 09/635,389

(22) Filed: Aug. 9, 2000

(51) Int. Cl.[7] .............................. B41J 15/14; B41J 27/00
(52) U.S. Cl. ........................................ 347/241; 347/256
(58) Field of Search ................................ 347/241, 244, 347/245, 256, 258; 356/563, 236; 372/501, 64; 250/339.07, 559.02, 586, 228, 229

(56) References Cited

U.S. PATENT DOCUMENTS

| | | | |
|---|---|---|---|
| 4,260,245 A | 4/1981 | Hujer | 355/40 |
| 4,922,089 A | 5/1990 | McGuire et al. | 250/205 |
| 4,965,575 A | 10/1990 | Wash | 341/72 |
| 5,075,716 A | 12/1991 | Jehan et al. | 355/1 |
| 5,400,116 A | 3/1995 | Jehan et al. | 355/53 |
| 5,452,055 A | 9/1995 | Smart | 355/68 |
| 5,461,450 A | 10/1995 | Long et al. | 396/661 |
| 5,598,008 A * | 1/1997 | Livoni | 250/586 |
| 5,646,713 A | 7/1997 | Powers et al. | 355/40 |
| 5,649,260 A | 7/1997 | Wheeler et al. | 396/569 |
| 5,667,944 A | 9/1997 | Reem et al. | 430/359 |
| 5,767,983 A | 6/1998 | Terashita | 358/302 |
| 5,799,029 A * | 8/1998 | Rossi et al. | 372/50 |
| 6,062,120 A | 5/2000 | Tsuzaki et al. | 83/76.1 |

* cited by examiner

Primary Examiner—Hai Pham
(74) Attorney, Agent, or Firm—Thomas H. Close

(57) ABSTRACT

Apparatus for exposing reference calibration patches onto photosensitive medium, includes: a light source; a plurality of optical fibers, one fiber for each element to be exposed; a light collector having an input port for receiving light emitted by the light source and an output port for delivering light to one end of the optical fibers; a plurality of light attenuators located with respect to the optical fiber for individually attenuating the light transmitted by each fiber; a projection print head located at the other end of the optical fibers for directing light from the fiber onto the photosensitive medium; and a controller connected to the light source for measuring and controlling the light output of the light collector.

49 Claims, 13 Drawing Sheets

APPARATUS FOR EXPOSING SENSITOMETRIC AND BAR CODE DATA ONTO PHOTOSENSITIVE MEDIA

FIELD OF THE INVENTION

The present invention relates to sensitometry and more particularly to apparatus for exposing sensitometric and bar code data onto photosensitive media in a manufacturing environment.

BACKGROUND OF THE INVENTION

The use of a sequence of reference calibration patches exposed on a roll of film to enable better exposure control during optical printing is known in the art. See for example U.S. Pat. No. 5,767,983 issued Jun. 16, 1998 to Terashita. The use of reference calibration patches has also been shown to be useful in determining correction values for scanned film data used in digital printing. See for example U.S. Pat. No. 5,667,944 issued Sep. 16, 1997 to Reem et al. and U.S. Pat. No. 5,649,260 issued Jul. 15, 1997 to Wheeler et al.

U.S. Pat. No. 5,075,716 issued Dec. 24, 1991 to Jehan et al. shows apparatus for exposing reference calibration patches on photosensitive media that includes a light source, and a bundle of optical fibers for transporting light from the light source to the photosensitive medium. The exposures to the photosensitive medium are controlled by providing groups of fibers having different numbers of fibers in each group and by apparatus for adjusting the spacing between the fiber bundles and the exposure plane. Furthermore, the exposure is accomplished by contacting the surface of the photosensitive medium with the print head of the apparatus to precisely locate the exposure plane and minimize flare.

There are many problems experienced with the use of conventional sensitometric apparatus to apply reference calibration patches to film. One problem is that contact exposures are not desirable in the manufacturing environment, since the surface of the film can be damaged or contaminated by contact with the print head of the sensitometer. Another problem is in exposing film at 4log E levels using a non-contact exposure apparatus without causing excessive image flare. Another problem is in providing a high enough exposure to expose the reference calibration patches in a short enough time (e.g. less than 100 milliseconds) to be compatible with the dwell time available for printing during the manufacturing process. An example of film manufacturing apparatus is described in U.S. Pat. No. 5,461,450 issued Oct. 24, 1995 to Long, et al. The film is transported in the apparatus using an intermittent motion that constrains the dwell time (the time that the film is stationary and the perforator punches are engaged with the film) as described above. A further problem relates to the size of both the conventional sensitometric apparatus and the size of the exposures produced thereby. It would be desirable to locate the sensitometer for exposing reference calibration patches into the manufacturing equipment of the photosensitive materials, where space is at a premium, to provide the most accurate placement of the patches and maximize the manufacturing system performance. It is also desirable to locate the sensitometric exposure device along with a barcode exposure device for the purpose of printing associated metadata and controlling both devices with a central control system There is also a need for a sensitometer that is easy to set up, reliably maintains its calibration in the manufacturing environment, and can automatically setup to meet the exposure needs of various product types without interrupting the process flow. A further need is to provide a sensitometer that is capable of reliably providing millions of exposures without failure or adjustment.

There is a need therefore for an improved apparatus for exposing sensitometric and meta data onto photosensitive media that avoids the problems noted above.

SUMMARY OF THE INVENTION

The need is met according to the present invention by providing an apparatus for exposing reference calibration patches onto photosensitive medium, including: a light source; a plurality of optical fibers, one fiber for each element to be exposed; a light collector having an input port for receiving light emitted by the light source and an output port for delivering light to one end of the optical fibers; a plurality of light attenuators located with respect to the optical fiber for individually attenuating the light transmitted by each fiber; a projection print head located at the other end of the optical fibers for directing light from the fiber onto the photosensitive medium; and a controller connected to the light source for measuring and controlling the light output of the light collector.

According to a further aspect of the invention, the apparatus includes a data printer having: a second light source; a two dimensional liquid crystal light modulator for modulating the light from the second light source; optics for projecting an image of the light modulator onto the photosensitive medium; and the controller being connected to the light modulator and the light source for applying a two dimensional bar code image signal to the light modulator and activating the light source for exposing the two dimensional bar code onto the photosensitive medium.

The apparatus operates as a system that prints both barcode data and sensitometric information on the photosensitive medium transported under the print heads located on a web transport of a photosensitive medium manufacturing machine.

ADVANTAGES

The apparatus of the present invention has the advantage of providing: a broad dynamic exposure range of up to 4 Log E; rapid exposure times regardless of film type; non-contact printing, whereby no part of the apparatus contacts the photosensitive and fragile film surface; precise, controllable, adjustable exposures; a reference calibration patch profile with a substantially flat profile shape at peak values along with a minimal flare skirt; and a precision of exposure of better than 1% over an 8× range of film speeds and product sensitivities.

In the preferred embodiment, the apparatus is located on a perforation/printing station of a film manufacturing machine at a specific location where a predetermined frame stops, regardless of film length, thus allowing one fixed location printer system to generate various film lengths without need for operator intervention or setup for film length changes on the station. Physically printing the reference calibration patches and the barcode data in the same frame location (frame 0) during the same machine index dwell, allows for the most accurate placement of each printed image relative to the other, resulting in minimal dimensional variation between the two image geometries.

The printer control system allows for more efficient and reliable data transfer from the reference calibration patch printer to the bar code data printer. This allows the barcode data printer the capability of reporting on certain characteristics of the reference calibration patch printer and including that info in the data printed by the bar code printer.

Minimum space is required for implementation on a production manufacturing machine and a minimum impact on present spooler control system during printing, and can be configured for projection printing on a planar or radiused film surface. Its modular design provides for minimized setup and install time. The preferred XENON illumination sources provide long life, stable and high reliability compared to tungsten or other sources.

The use of optical fibers allows for the transport of precise signals through an electromagnetically noisy machine space. The small footprint, very fast cycle, and ease of maintenance, result in a significant improvement in overall performance compared to standard sensitometers. Separating light source from the print head and joining them with optical fibers allows for flexible placement of the print head on the machine, and easy replacement of the light source or print head.

Communications between the printer control system with the web transport control system allows for filmstrips with the same data message to be identified by cartridge ID and other specific data. The identification information can be stored in the factory. This identification can be used to provide data corrections or updates by communicating the updates to the photofinisher and using the identification information printed in the data and located on the cartridge to identify the affected filmstrips.

DETAILED DESCRIPTION OF THE INVENTION

Figure 1:
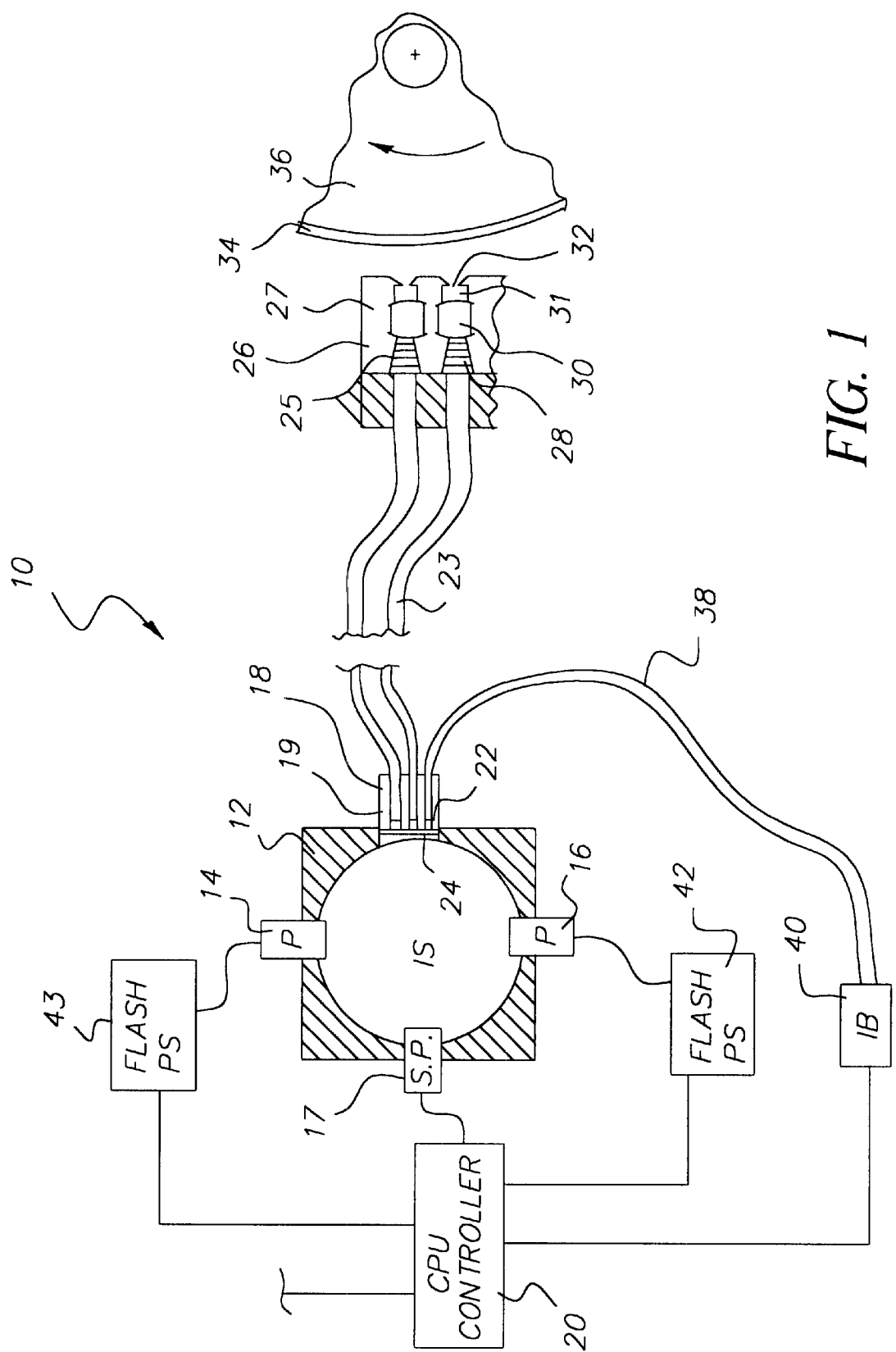
FIG. 1 is a schematic diagram of apparatus for exposing reference calibration patches according to the present invention.

Referring to FIG. 1, apparatus for exposing reference calibration patches to form a latent image onto photosensitive medium, generally designated 10, includes a light collector such as an integrating sphere 12, having a plurality of apertures. A pair of flash lamps 14 and 16, preferably Xenon flash lamps, are located in two of the apertures, and an attenuator filter plug 18 is located in another of the apertures. Each flash lamp 14 and 16 is connected to a power supply 43 and 42 respectively and can be caused to emit one pulse of light when triggered by controller 20. Attenuator filter plug 18 captures light exiting integrating sphere 12 and transfers it into multiple reference calibration patch optical fibers 23, as well as multiple exposure control optical fibers 38. A spectrophotometer 17 is inserted into an additional aperture in integrating sphere 12 to collect information on the spectral energy distribution of the exposure light and relay it to controller 20. Exposure control optical fibers 38 sample the exposure light and transfer it to exposure integrator circuit 40 which interfaces with controller 20 to control the exposure level as will be detailed later.

Optical fibers 23 transmit the light from integrating sphere 12 to projection printhead assembly 26 which can be located distant from the rest of reference calibration patch exposure apparatus 10. Optical fibers 23 are preferably multimode optical fibers such as 2 mm diameter PMMA (poly-methyl-methyl acrylate) plastic fibers manufactured by Mitsubishi Rayon and known as type ESKA™. Projection printhead assembly 26 is located in a fixed location relative to photosensitive media 34 which is in contact with photosensitive media transport and indexing drum 36. Projection printhead assembly 26 consists of projection printhead body 27 into which optical fibers 23 enter. The end of optical fiber 23 is polished and held a fixed distance from the surface of media 34 by projection printhead body 27. Projection printhead lens 30 focuses an inverted image of the end of optical fiber 23 onto media 34 at substantially 1:1 magnification. Lens 30 is preferably a simple symmetric bi-convex lens of BK-7 glass with a first surface radius of 1.5 mm, a second surface radius of −1.5 mm and a thickness of 3-mm. Lens 30 is also preferably coated with an anti-reflection coating optimized for broadband white light in the 400–700 nm region. Between the end of fiber 23 and lens 30 is located a projection printhead input baffle 28 whose function is to trap non-image light rays and stop them from creating flare light at the image plane. Baffle 28 is formed by steps 25 that are provided with a non-reflective surface such as black anodization or light absorbing paint that assists in trapping non-image light rays. Between lens 30 and the image plane on the surface of media 34 is a projection printhead glare stop aperture 32. The function of glare stop aperture 32 is to stop any non-image light from forming glare around the exposed image. A hollow projection printhead output chamber 31 is formed between the second surface of lens 30 and glare stop aperture 32.

Figure 2:
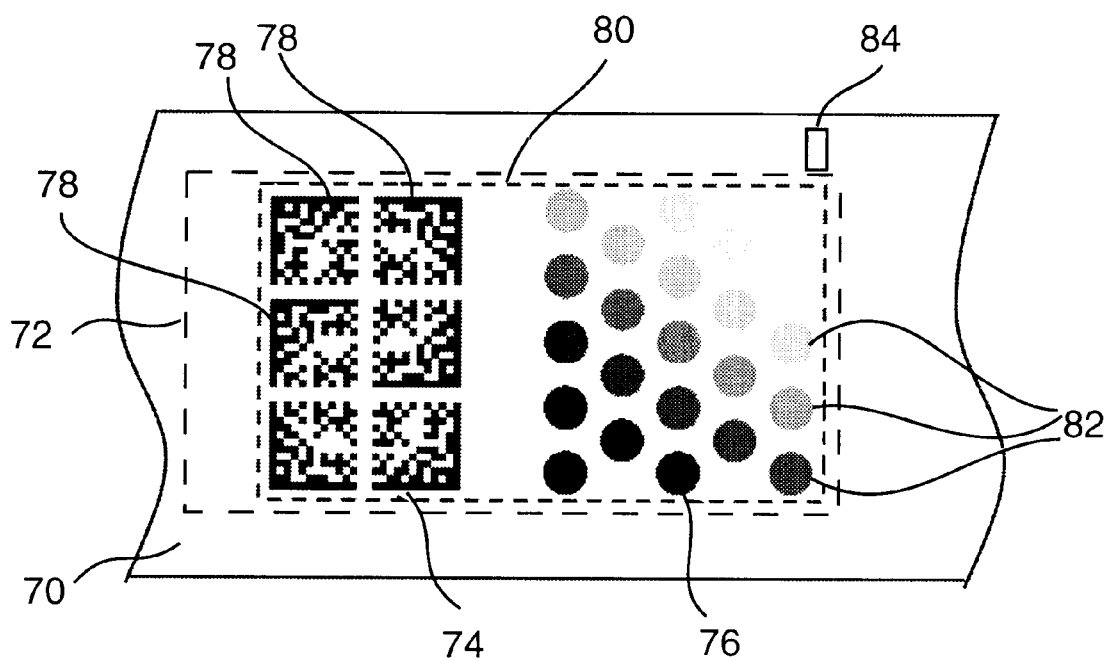
FIG. 2 is a diagram showing a reference calibration target which includes an array of reference calibration patches and an array of 2-D bar code symbols produced by the apparatus of the present invention.

This invention can be used to expose different film formats. One example is the film format known as the Advanced Photographic System (APS) which is documented in published system specifications, known as the Redbook. FIG. 2 illustrates an arrangement of latent image exposures on an APS format photographic element. The APS system reserves specific areas on the photographic element for use by photofinishing apparatus. These areas can be used for exposing reference calibration patches, and other data used in the photofinishing process. Referring to FIG. 2, an APS format photographic element 70, comprising a strip of photosensitive media 34, according to the Redbook specification, is shown. The film strip includes a first reserved frame 72 (known as "Frame 0") reserved for use in photofinishing apparatus and outside the customer image area. Perforation 84 is provided adjacent to frame 0 72 on the film strip 70 and locates the position of frame 0 72 along the filmstrip. According to a preferred embodiment of the present invention two latent images are exposed in frame 0 72. These are a reference calibration patch array 76 consisting of a plurality of reference calibration patches 82, and a 2D Barcode symbol array 74 consisting of an arrangement of 2D barcode symbols 78. Both arrays 76 and 74, are arranged as shown in FIG. 2 within a second reserved area 80, located within frame 0 72. Other arrangements of the arrays are possible.

Figure 3:
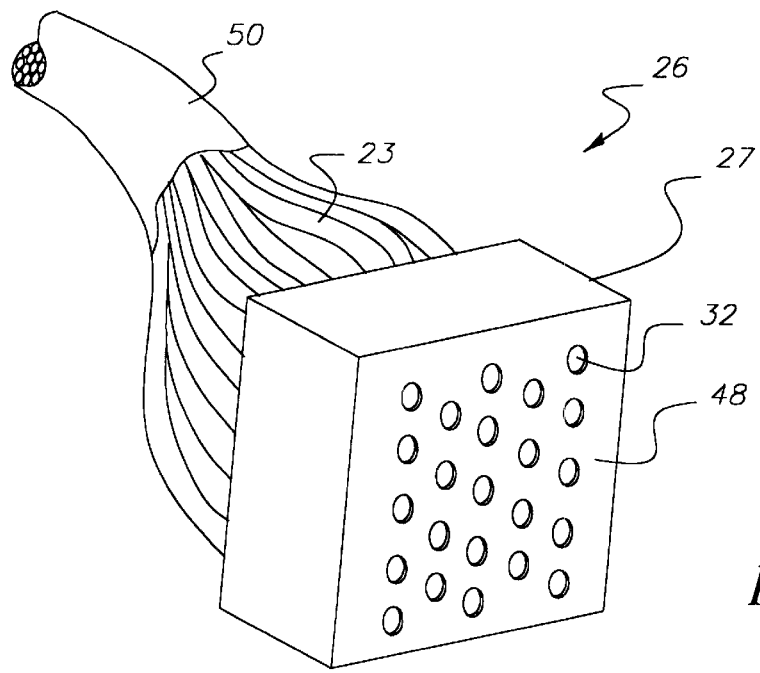
FIG. 3 is perspective view of the print head shown in FIG. 1.

FIG. 3 shows a perspective view of the projection printhead assembly 26. Printhead assembly 26 consists of a printhead body 27 connected to a plurality of optical fibers 23. The optical fibers 23 are collected into optical fiber bundle 50. Light energy transmitted through an optical fiber 23 into the printhead body 27 passes through the body 27 to exit the head via a projection printhead glare stop aperture 32 and on to the photosensitive media 34 (not shown). An antireflective surface 48 on the printhead body 27 reduces reflections of the light energy between the media 34 and the opposing surfaces of printhead body 27. An example of how this is achieved would be to apply a surface coating, such as a Sherwin Williams Co Flat Black E61 Series Epoxy enamel with 0–5% Gloss, alternatively or in combination with a diffuse surface texture, such as resulting from bead blasting the surface.

Figure 4:
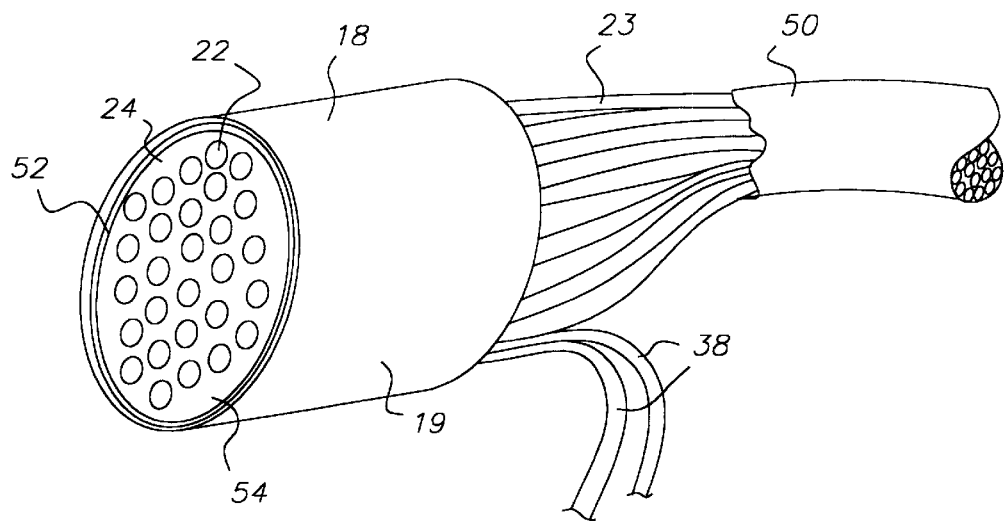
FIG. 4 is a perspective view of the filter plug shown in FIG. 1.

FIG. 4 illustrates the attenuation filter plug assembly 18. Plug assembly 18 consists of a attenuation filter plug body 19 connected to a plurality of reference calibration patch optical fibers 23 and exposure control optical fibers 38 with the optical fibers 23 collected into optical fiber bundle 50. Light energy collected in the integrating sphere 12 (not shown) passes into the filter plug assembly 18 through the optical color correction filter 24 and through aperture mask 54 and into the individual attenuation filters 22 before passing finally into the fiber optics 23. Aperture mask 54 is aligned with the plurality of individual attenuation filters 22 such that each attenuation filters 22 is aligned with an individual aperture in the aperture mask 54 to insure that light does not leak around the edges of the attenuation filters 22. The attenuation filters 22 are preferably a stable optical neutral density filter such as Inconel™ on glass, or other material as known in the art. Color correction filter 24 is also preferably a stable optical filter material such as a Schott FG type glass or similar material as known in the art. Retaining ring 52 holds filter 24 and mask 54 in place in a recess formed in plug body 19.

Figure 5:
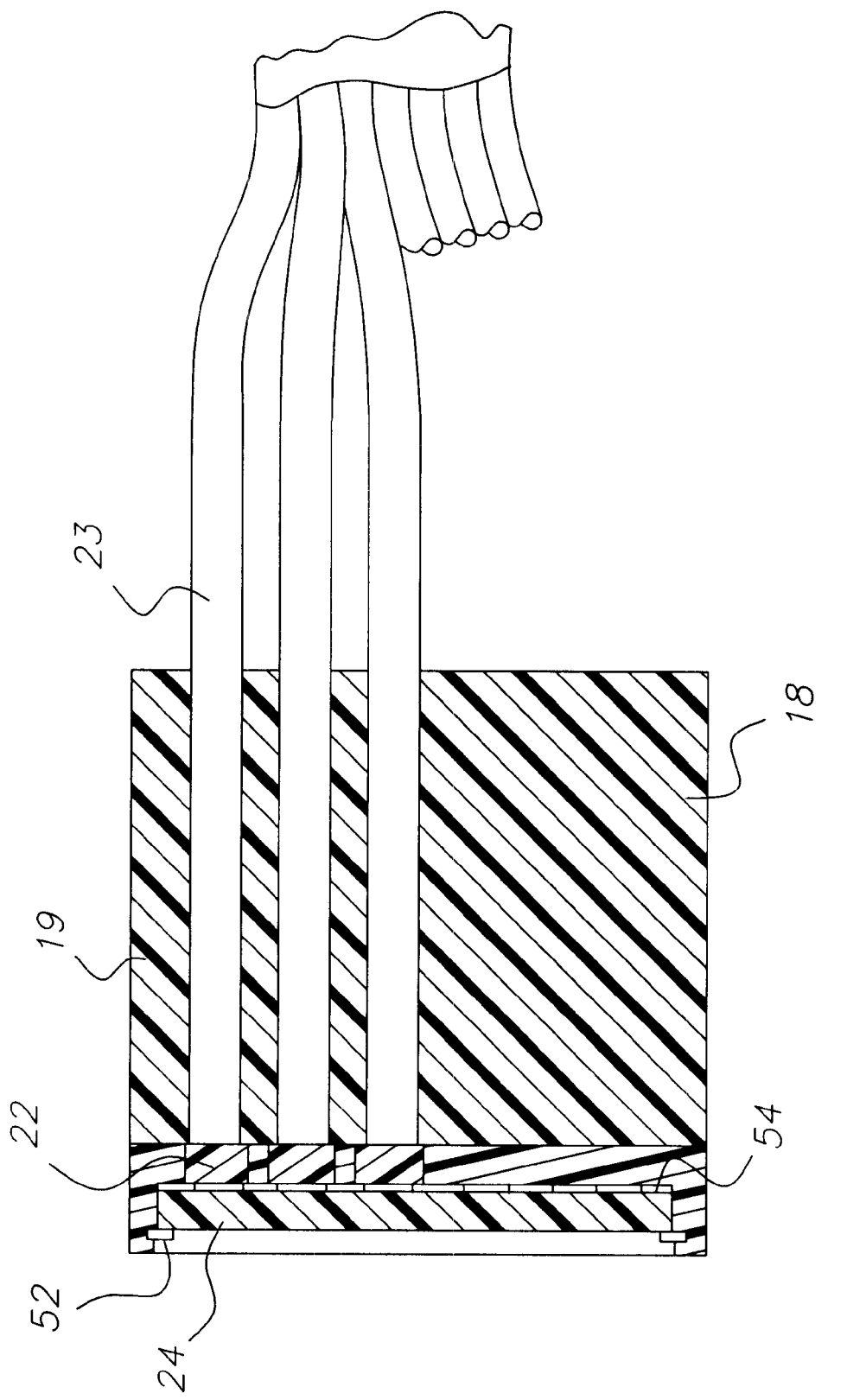
FIG. 5 is a cross sectional view of the filter plug shown in FIG. 1.

FIG. 5 is a partial cross sectional view further describing the filter plug assembly 18 described in FIG. 4 and showing its internal construction. Light energy collected in the integrating sphere 12 passes into the filter plug assembly 18 through optical color correction filter 24 located on one end of the plug body 19. Optical correction filter 24 is used to adjust the spectrum of light passed through individual attenuation filters 22 by attenuating particular undesirable wavelengths such that a desired color spectrum is achieved. This color corrected light then passes through aperture mask 54 and through the array of individual attenuation filters 22 and into optical fiber 23. Each attenuation filter 22 has a unique optical neutral density or color resulting in a unique latent image exposure level for each reference calibration patch 82 as shown in FIG. 2. The reference calibration patches produced by this system can be neutral, colored or any combination thereof.

Figure 6:
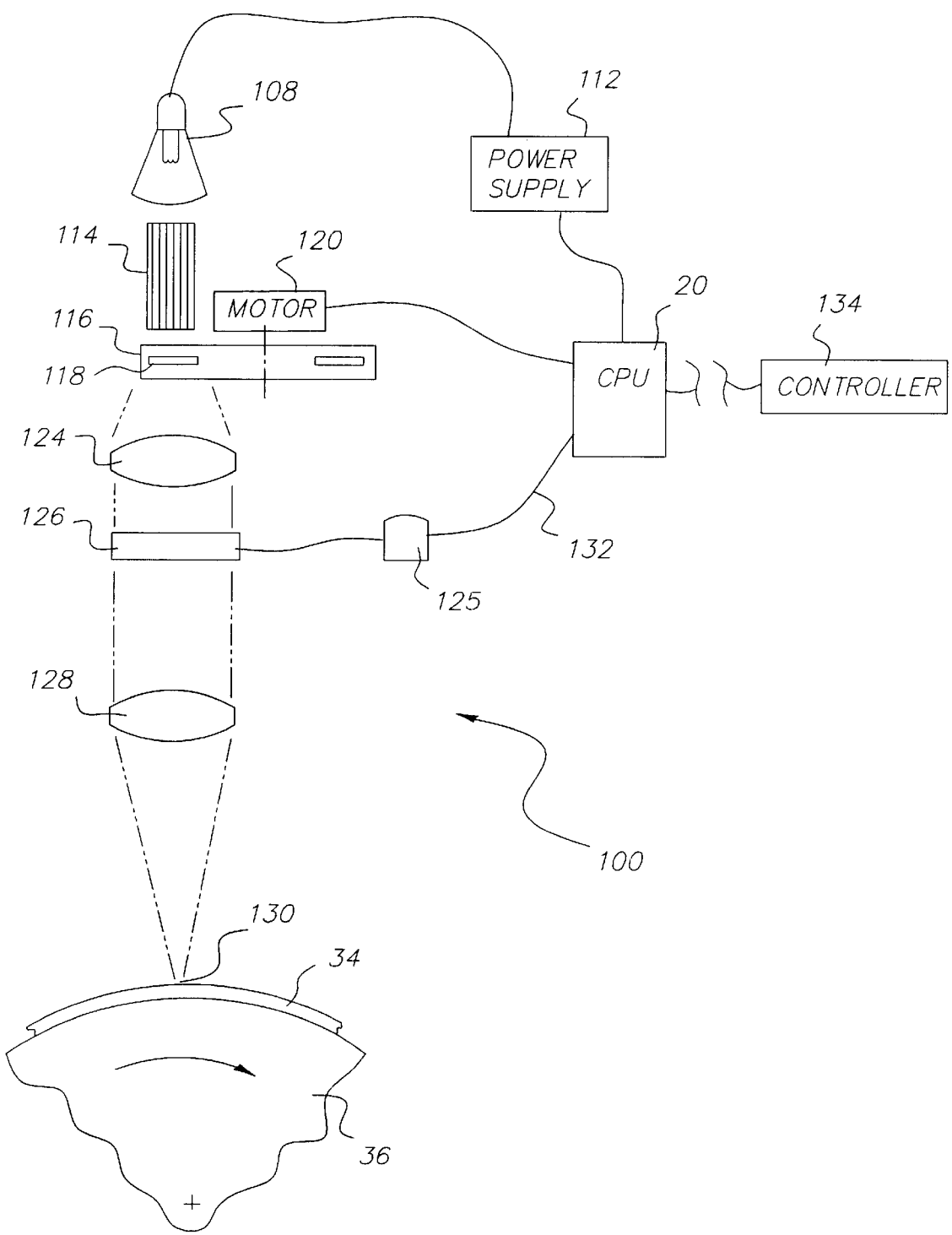
FIG. 6 is a schematic diagram of the data printer according to one aspect of the present invention.

Referring to FIG. 6, a data printer, generally designated 100, for exposing bar code data symbols onto photosensitive medium, includes illumination source 108, preferably a Xenon flash with suitable reflector (not shown), driven by power supply 112 further controlled by a controller 20. The controller 20 uses various control inputs in its operation, including those from overall machine controller 134. For example, the machine controller 134 sends timing information to trigger the flash as well as apparatus calibration and setup information to controller 20. The illumination source 108 directs uniform illumination into a fiber optic bundle 114.

The fiber optic bundle 114 directs the illumination to pass through color correction filter 118 housed in housing 116. Housing 116 contains a plurality of filters arranged in a manner that allows them to be individually introduced in front of the fiber optic bundle 114 by rotation of housing 116. Housing 116 is attached at its center to the shaft of motor 120 allowing it to be rotated by motor 120. Motor 120 is controlled by signals from controller 20.

Illumination passing through filter 118 passes through condenser optics 124 and toward light valve array 126, preferably a liquid crystal device (LCD) array. Light valve array 126 has a plurality of individually addressable pixels for selectively blocking or transmitting illumination to form characters and specific geometry in response to the address and energization of the individual pixels. The light valve array 126 is driven by video driver 125 and the driver 125 driven by controller 20 via control line 132.

Illumination passing light valve array 126 forms an image that passes further through focusing optics 128 to be focused down to the imaging position 130 on the photosensitive medium 34 forming a latent image. Photosensitive media 34 is supported and transported on the photosensitive media transport and indexing drum 36 of a web transport device. The photosensitive media is held to the indexing drum 36 by means of a suitable traction inducing device (not shown), for example a vacuum generated between the media and drum or a nip roll compressing the media against the drum 36

In operation, the printer receives setup information from machine controller 134 that is passed to the controller 20. This information, for example, film strip length and film product code, is used to select the correct color correction filter 116 and rotate it into place via motor 120 as well as set up the proper level and duration of illumination source 108. The indexing drum 36 moves photosensitive media 34 into the proper location along the media to the imaging position 130 shown in FIG. 6. Indexing drum 36 is then directed to stop motion by machine controller 134. Machine controller 134 then recognizes that photosensitive media 34 is in position and directs controller 20 to flash illumination source 108 via power supply 112. The illumination passes through the system, generating an image at light valve 126 that is focused onto the photosensitive media at imaging position 130 and completing the cycle. Indexing drum 36 is then directed by machine controller 134 to begin the next cycle of operation and move to the next filmstrip position.

Figure 7:
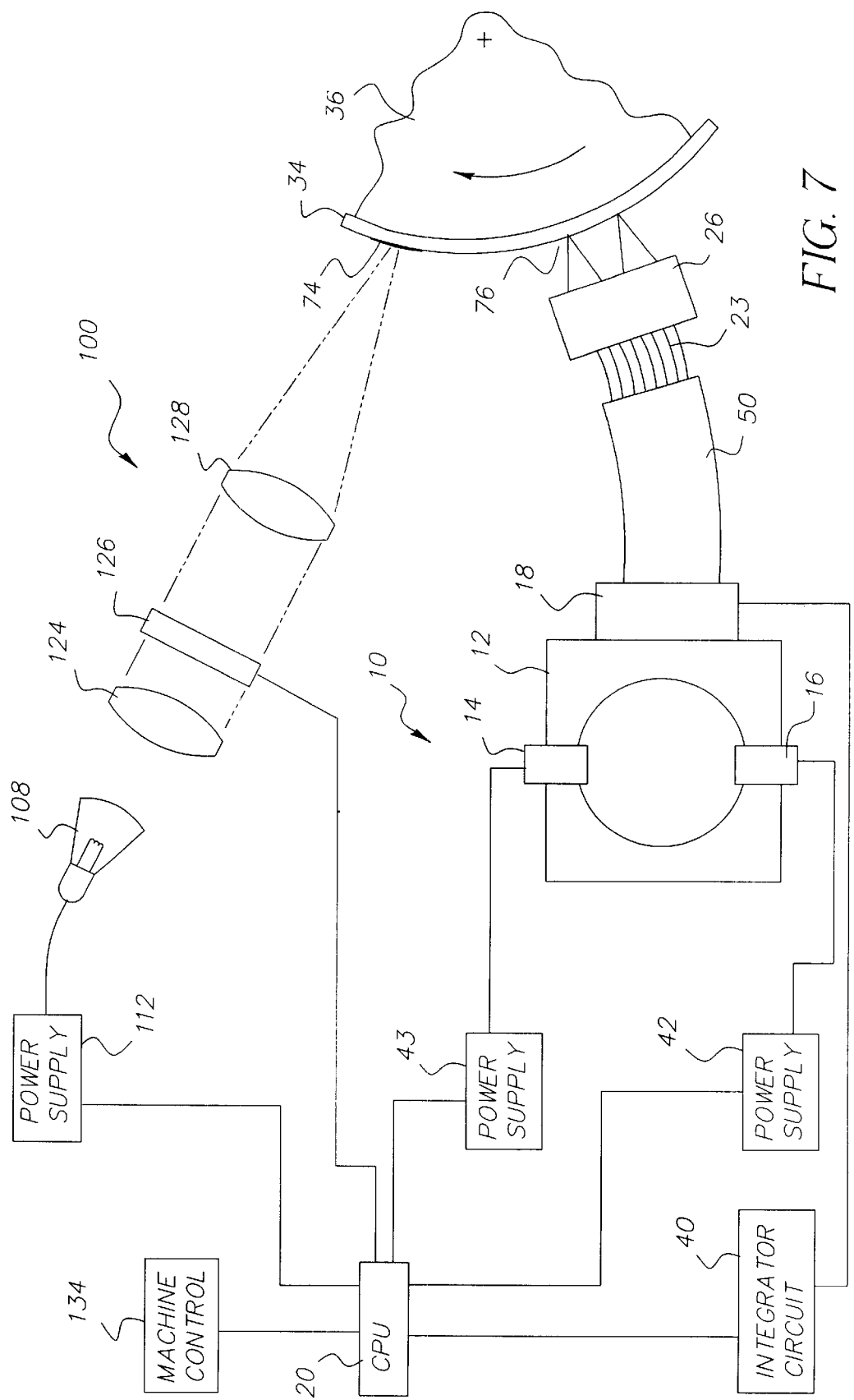
FIG. 7 is a schematic diagram of the overall control system of the apparatus of the present invention.

Referring now to FIG. 7 the interconnection of both the reference calibration patch printer 10 and data printer 100 is illustrated. Note that not all parts are shown for both printers; refer to FIGS. 1 and 6 for full details. Power supply 112, triggered by a signal from controller 20, flashes illumination source 108 whose light is collected by condenser optics 124 and modulated by light valve array 126. The spatial pattern used to modulate the light is generated by controller 20 in response to data from machine controller 134. Focusing optics 128 images the modulated light from light valve 126 onto photosensitive media 34 held on photosensitive media transport and indexing drum 36 forming 2D barcode symbol array 74. Adjacent to symbol array 74 is reference calibration patch array 76 formed by reference calibration patch printer 10. Controller 20 commands power supplies 42 and 43 to activate flash lamps 14 and 16 as will be described in detail later. Controller 20 uses photosensitive media sensitivity data from machine control 134 as well as data from exposure integrator circuit 40 to build an accurate latent image exposure through integrating sphere 12 and projection printhead assembly 18. Both reference calibration patch printer 10 and data printer 100 are commanded to make exposures when photosensitive media 34 and media transport and indexing drum 36 are substantially stopped as communicated by machine control 134.

Figure 8:
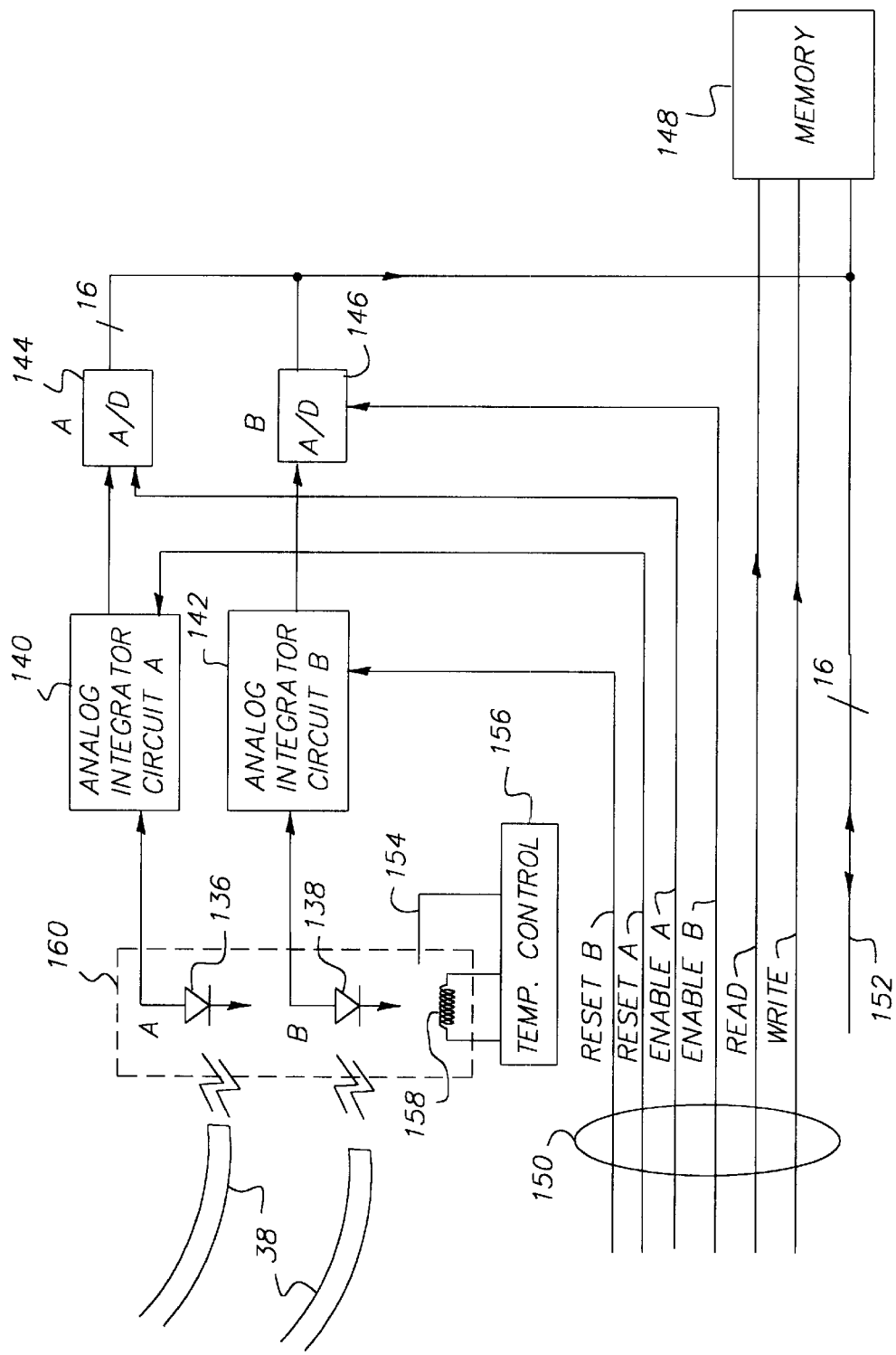
FIG. 8 is a schematic diagram of the sensitometric exposure control system shown in FIG. 7.

Illustrated in FIG. 8 is a more detailed description of the exposure integrator circuit 40. Optical fibers 38 deliver light energy from integrating sphere 12 to photosensors 136 and 138. Photosensors 136 and 138 are preferably silicon photodiodes. Exposure integrator circuit 40 contains two redundant channels labeled "A" and "B". To enhance reliability, photosensors 136 and 138 are preferably of similar functional capabilities, but from different manufacturers, thus reducing the probability of both failing or degrading at the same rate. As light energy is captured by the photodiodes an electrical current is produced and integrated by analog integrator circuits 140 and 142. Analog integrator circuits are well known in the art and one example is Burr Brown Part #IVC102, Tucson Ariz. The output of the integrator circuits is applied to the input of analog to digital converters 144 and 146. Analog to digital converters 144 and 146 are shown as having 16 bit parallel digital data outputs, but converters with different resolution and/or serial outputs may be made to work as well. A 16 bit bi-directional digital data bus 152 connects the converters with controller 20 shown in FIG. 1. A control signal bus 150 connects controller 20 with converters 144 and 146, and integrators 140 and 142. Individual control signals are provided to reset integrators 140, 142 and to enable the output of converters 144, 146. Also present on the exposure integrator circuit 40 is a nonvolatile memory 148. This device could be an EEPROM, battery backed up SRAM, or any other nonvolatile digital memory device. Non-volatile memory 148 is connected to controller 20 via data bus 152 and control signal bus 150. Read and write control lines connect nonvolatile memory 148 with CPU 20 via signal bus 150.

Also present on exposure integrator circuit 40 is a temperature compensation mechanism comprised of temperature sensor 154, temperature controller 156, heater 158, and heatsink 160. Photosensors 136 and 138, and temperature sensor 154 are tightly coupled thermally to heatsink 160 such that they are all at substantially identical temperatures. Temperature controller 156 senses this temperature via temperature sensor 154 and applies power as necessary to heater 158 to maintain a constant temperature just slightly above the ambient temperature. This mechanism corrects for the temperature-induced drift in the sensitivity of photosensors 136 and 138.

Figure 9:
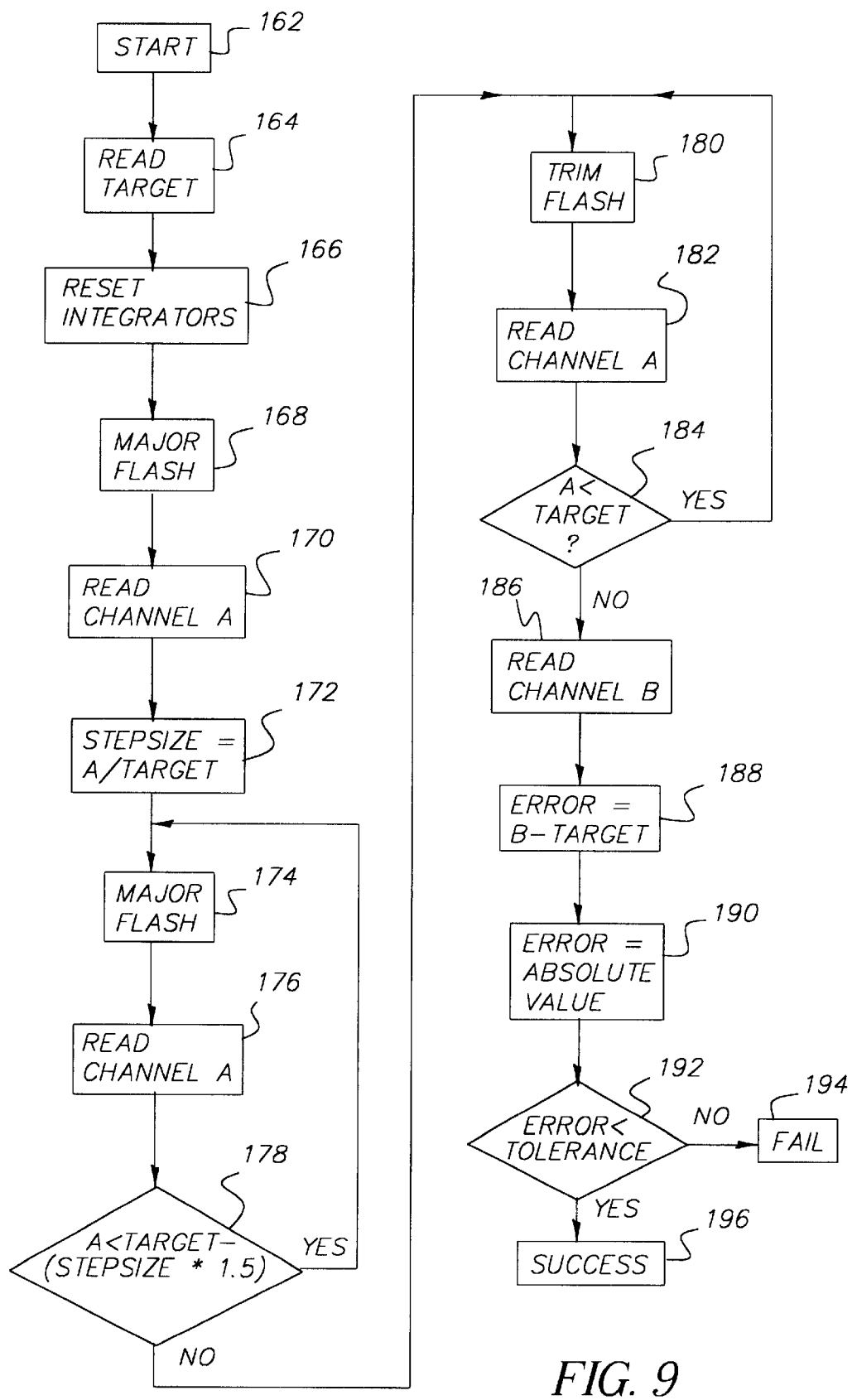
FIG. 9 is a flow chart showing the method of driving the flash lamps for exposing sensitometric data.
Figure 10:
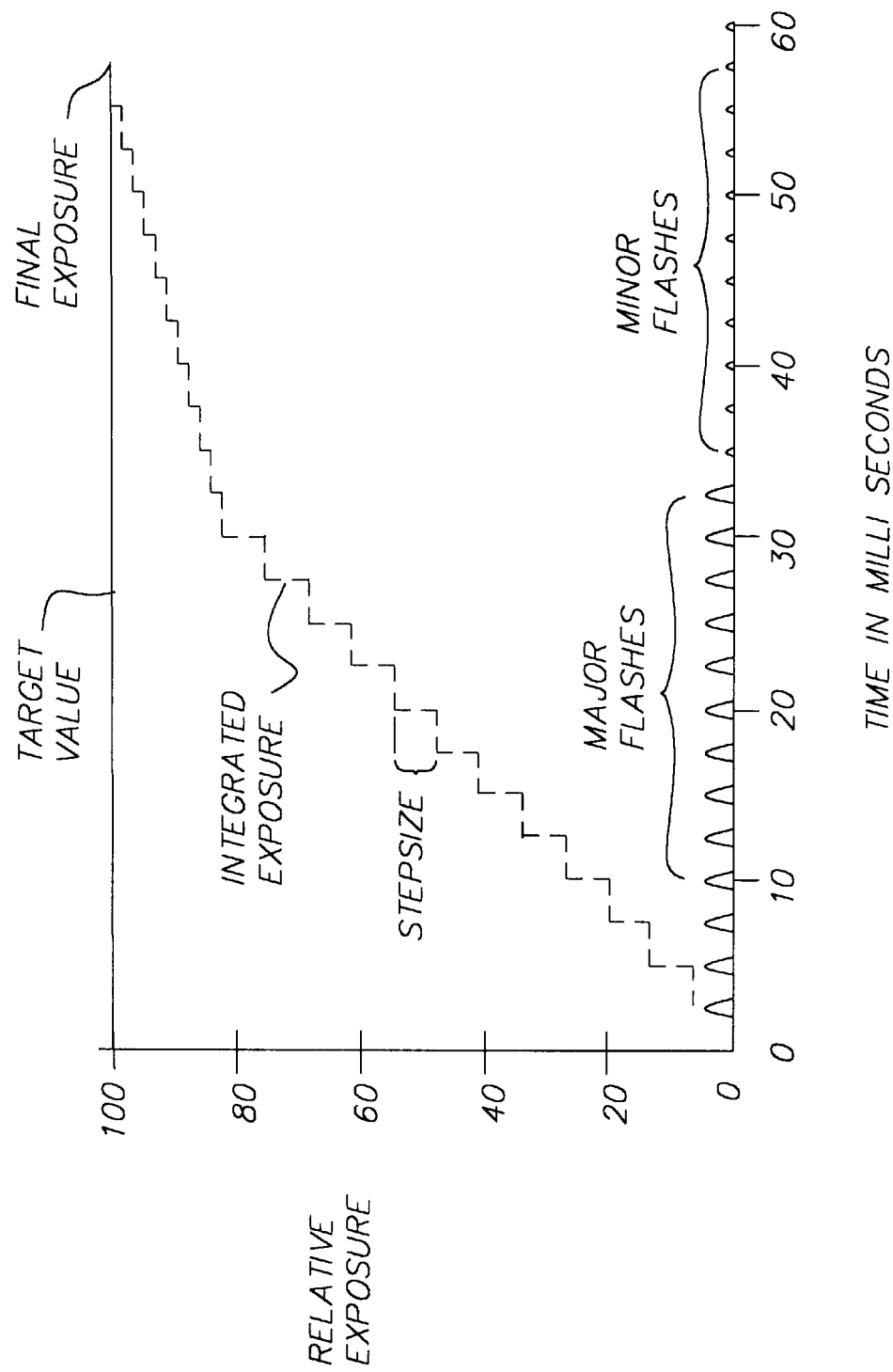
FIG. 10 is a graph useful in describing the method shown in FIG. 9.

Referring now to FIGS. 9 and 10, the sequence of operation of the flash lamps 14 and 16 will be described. Starting at step 162 the second step is to retrieve a target exposure value from non-volatile memory 148 (shown in FIG. 8), as shown in step 164. Different target exposure values will be determined by calibration and stored in memory 148, one target value for each film speed. The next step in the sequence consists of resetting the integrator circuits 140 and 142 in FIG. 8, as shown in step 166. Next a "major" flash pulse is generated by triggering flash lamp power supply 43 in FIG. 1, as shown in step 168. In step 170 a reading is made by transferring the digital data from analog to digital converter "A" 144 in FIG. 8 to controller 20 in FIG. 1. Step 172 illustrates the calculation of an intermediate variable "stepsize" by dividing the reading from the analog to digital converter by the target value. The next step, shown in step 174 is to cause another major flash lamp pulse to be generated. This is followed in step 176 by reading the analog to digital converter value. A decision is made in step 178 by comparing the current analog to digital converter value to the target value minus 1.5 times the stepsize variable. As long as the current analog to digital converter reading is less than this calculated value the sequence continues by looping back to box 174 and generating additional Major flash pulses. Once the analog to digital converter reading exceeds the calculated value the sequence continues on to box 180. At this point the majority of the integrated exposure energy has been created and delivered to the film.

FIG. 10 illustrates graphically one method of building the integrated exposure. The target value (which is fixed), the integrated exposure (equivalent to the analog to digital converter output), and the individual major and trimming flashes (equivalent to the photosensor output) are plotted versus time. As the sequence proceeds as described above the integrated exposure increases in large steps to quickly approach the final target. From here on, the exposure increases slowly in smaller steps to achieve very fine accuracy of exposure.

Referring again to FIG. 9, the sequence continues in step 180 by causing a trimming flash to be generated by flash lamp power supply 42 and flash lamp 16. In step 182 the output of the analog to digital converter is read. Step 184 shows the comparison of the latest reading to the target value, as long as the reading is less than the target the sequence returns to step 180 and continues to flash. After the reading exceeds the target value, flashing stops and the sequence proceeds to step 186. It can be seen that by adjusting the trimming flash level it is possible to achieve the integrated exposure level within a resolution of ±1 trimming flash energy unit. Now in step 186 the value generated by the second or "B" channel is read. By reading the output from analog to digital converter 146 and subtracting it from the target value in step 188 an error value is generated. Next the absolute value of the error value is formed in step 190. In step 192 the error value is compared to a predetermined tolerance and the sequence ends in either success or failure in steps 196 and 194 respectively. Alternatively, the large and small exposures can be performed simultaneously to reduce the exposure time.

A concern in the manufacturing environment is that of contamination entering the glare stop aperture 32 and settling on the printhead lens 30 in the projection printer assembly 26 of the reference calibration patch Printer 10 effectively blocking or degrading the projected illumination. This contamination may consist of chips or flakes of photosensitive media 34 generated as the result of the perforating process, or other cutting processes not illustrated here, and left loosely attached to the media 34. Interactions between the media 34 and a perforator/printer station of a web transport 240 (see FIG. 14) may cause this loosely attached contamination to become dislodged from media 34 and thrown into the glare stop aperture 32. Another source of contamination is from maintenance activities in the area near the printhead assembly 26. Cleaning solvents, and other contaminates used during maintenance may be inadvertently directed toward the glare stop aperture 32 possibly blocking or degrading the projected image.

In either case, the contamination may be very difficult to clean away due to the plurality of apertures 34 and general construction of the printhead body 27. A printhead apparatus that allows for easy removal of contamination would be desirable. An apparatus for protecting the glare stop aperture 32 and printhead lens 30 from being contaminated is also desirable.

Figure 11:
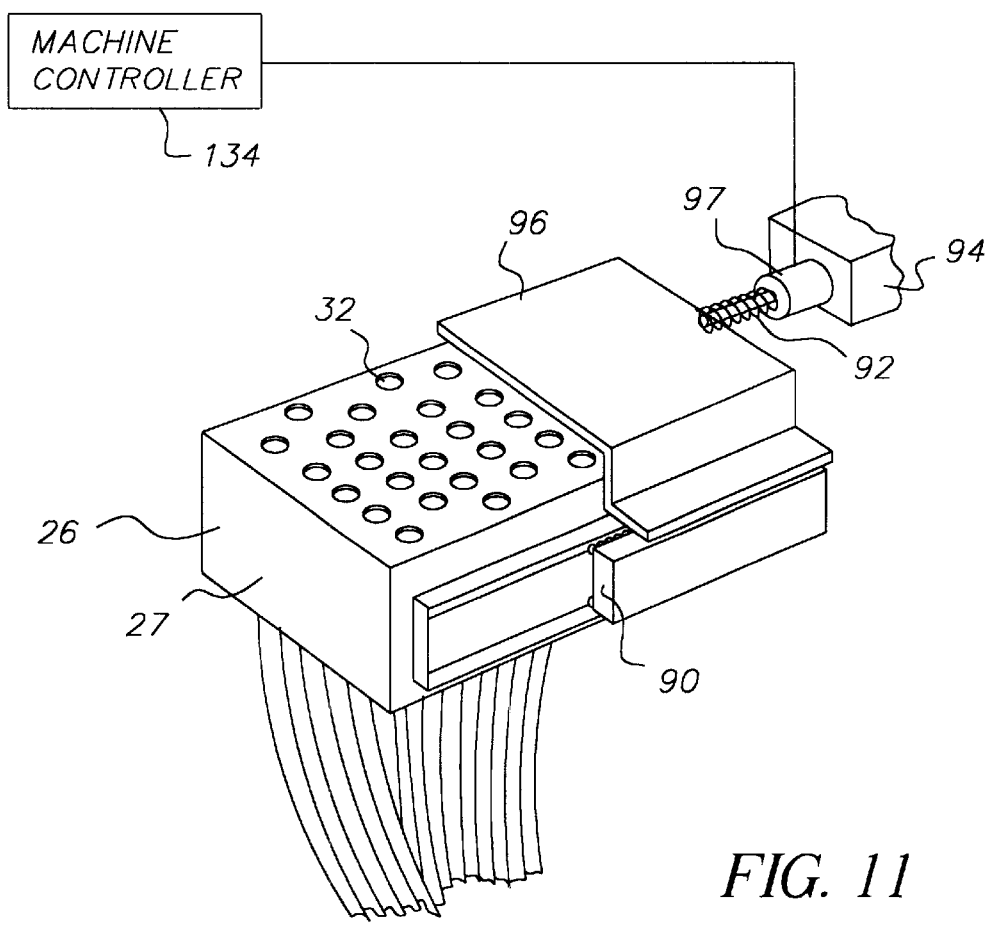
FIG. 11 is a perspective view showing a moveable cap for the print head shown in FIG. 3.

To address this problem, as shown in FIG. 11, a moveable cover 96 is supported by cover bearing 90 attached to the projection printhead body 27. Moveable cover 96 is retracted into a position exposing the plurality of glare stop apertures 32 by cover actuator 97 connected to support 94. In this position the printhead assembly 26 is configured to expose the photosensitive media 34. Cover actuator 97 may be an electrical solenoid or similar device activated by the overall machine controller 134. A cover return spring 92 urges the moveable cover 96 into the extended position covering the plurality of glare stop apertures 32 when the actuator 97 is de-energized, thus providing contamination protection by shielding the plurality of glare stop apertures 32 from the environment.

Figure 12:
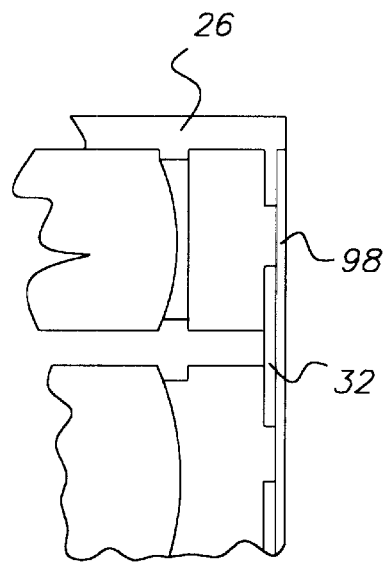
FIG. 12 is a partial view showing a fixed transparent protective cap over the print head shown in FIG. 3.

An alternative arrangement is shown in FIG. 12 where a fixed transparent cover 98 with antireflective surfaces is attached to the front of the printhead body 27 in a position that covers the plurality of glare stop apertures 32. This cover remains in place at all times shielding the plurality of glare stop apertures 32 from the environment and providing a front surface that can be easily cleaned if contaminated.

Figure 13:
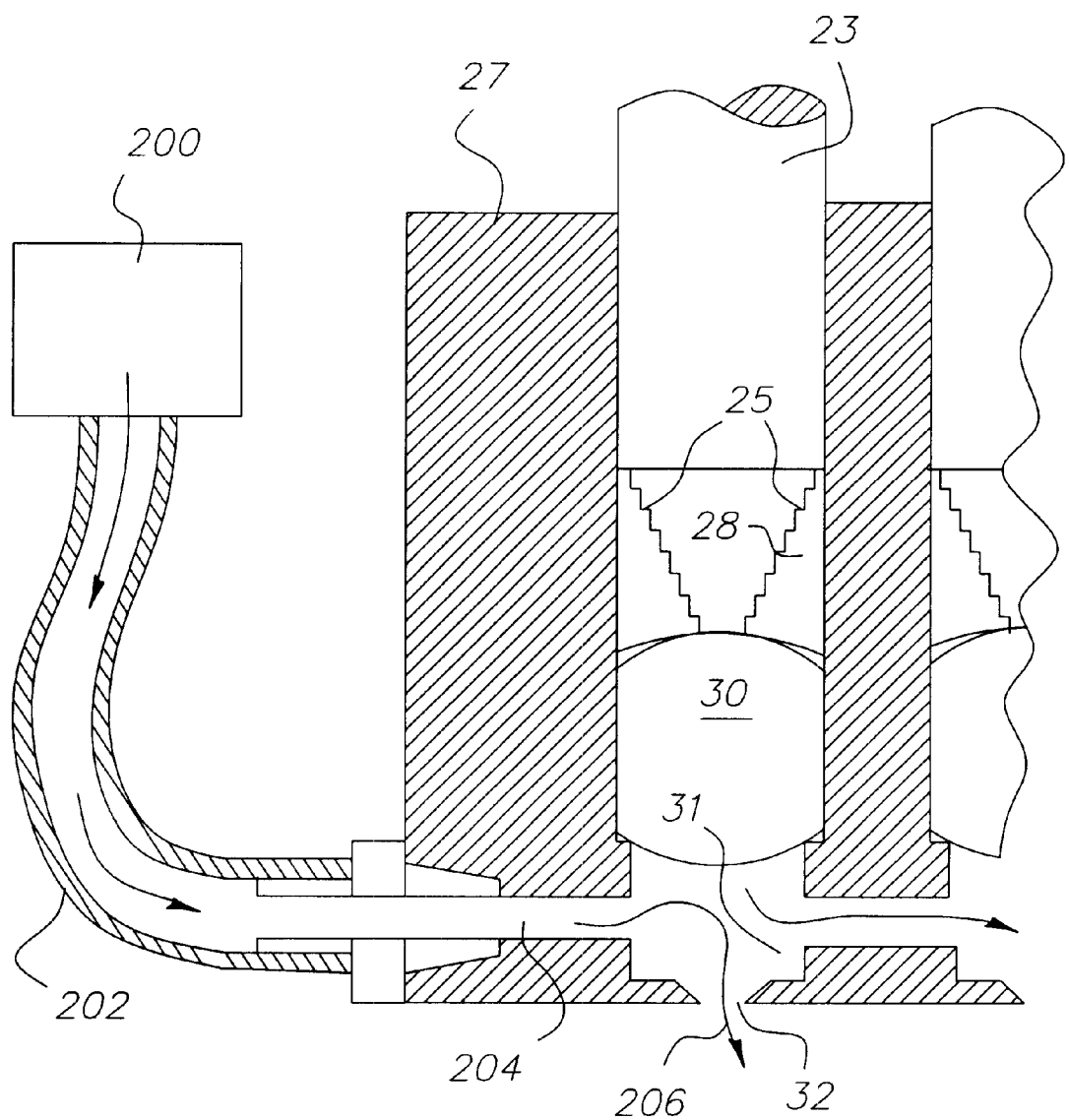
FIG. 13 is a partial view of a pressurized print head.

Another alternative arrangement is shown in FIG. 13 where the contamination is prevented from entering the plurality of glare stop apertures 32 by means of a continuous flow of pressurized air exiting from each aperture 32. Projection printhead body 27 containing the plurality of optical fibers 23, input baffle 28, lens 30, and glare stop aperture 32 are configured as shown in FIG. 13. A small output chamber 31 is formed between aperture 32 and lens 30 by the assemblage of the components as shown. One end of delivery channel 204 is ported into the sidewall of the chamber 31 as shown, and the other end is connected to delivery tube 202. Tube 202 is further connected to a pressurized air source 200 which supplies a constant flow of clean pressurized air to tube 202. Air flowing through tube 202 and channel 204 enters chamber 31 as shown, pressurizing chamber 31 and then exiting glare stop aperture 32 along the airflow path 206, exhausting to the environment. Connections between the plurality of glare stop apertures 32 allow for the plurality of chambers 31 to be similarly pressurized, exhausting air along similar air flow paths 206.

The air continuously flowing out of glare stop aperture 32 and along air flow path 206 effectively prevents typical environmental contamination from entering the plurality of glare stop apertures 32, maintaining the imaging performance of printhead assembly 26

Figure 14:
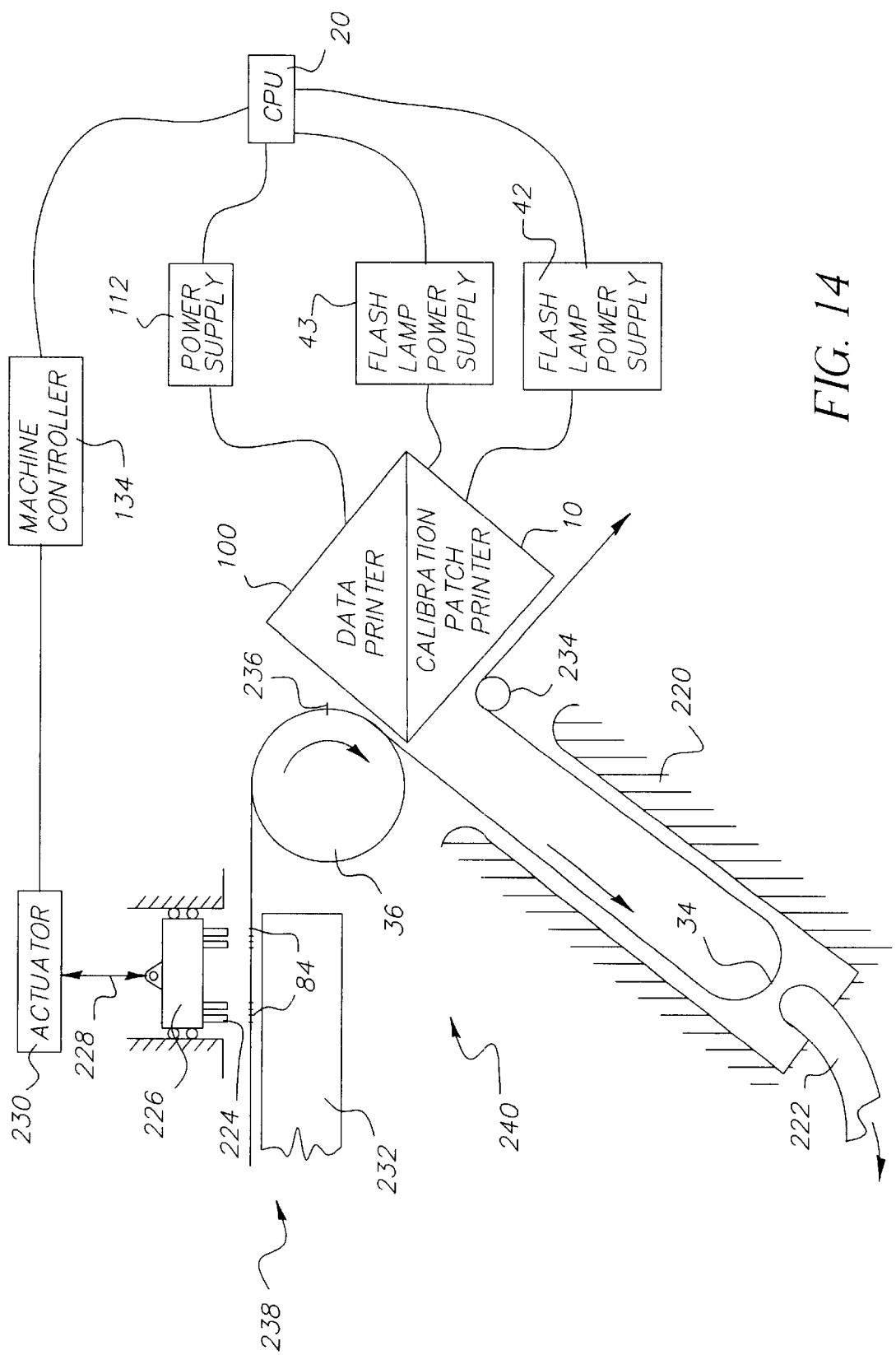
FIG. 14 is a schematic diagram showing the location of the apparatus of the present invention on a film perforation/printing machine.

FIG. 14 illustrates the arrangement of the entire printing system consisting of the perforator/printer station of a web transport 240, the reference calibration patch printer 10, and data printer 100 as well as associated control connections. Printers 10 and 100 are designed to produce the reference calibration patch array 76 and 2D barcode symbol array 74 in frame 0 72 relative to perforation 84 in a photographic element 70 as shown in FIG. 2.

Media 34 is supported by web transport rollers (not shown) and rotatable indexing drum 36 such that it passes between fixed perforator die 232 and moveable perforator punch support 226 of perforator assembly 238. Support 226 moves in a linear fashion and contains a plurality of punches 224 that are used to generate perforations in the film, such as perforation 84, when the punch 224 is moved into engagement with the fixed perforator die 232 through the motion of support 226. The support 226 is moved linearly by actuator link 228 that is attached to actuator 230. Actuator 230 may, for example, be a servo motor driving an eccentric linkage connected to support 226. Actuator 230 receives signals from overall machine controller 134 to start and stop a cycle of motion that corresponds to a perforation cycle where punch 224 and fixed perforator die 232 operate to form a perforation or plurality of perforations in the media 34.

Media 34 supported on the rotatable indexing drum 36, passes by printers 100 and 10 and then into a suction box 220 and eventually over idler roller 234 and continuing to further process steps not shown. The purpose of the suction box 220 is to tension the film invariantly regardless of media 34 velocity and acceleration through the station 240. Suction box 220 operates under sub-atmospheric pressure generated by a vacuum source (not shown) drawing air through exhaust pipe 222.

Data printer subsystem 100 mounted on the station 240 in a position radially and circumferentially located over indexing drum 36, is actuated by a power supply 112 further controlled by a controller 20. Reference calibration printer 10, mounted on the station 240 in a position radially and circumferentially located over indexing drum 36 is actuated by a power supply 43 and 42 and further controlled by controller 20. Printers 10 and 100 are further mechanically located with respect to each other to assure precise placement of the reference calibration patch array 76 and the 2-D barcode data symbol array 74.

Perforator/printer station common exposure location 236 represents a location whereby frame 0 72 and adjacent perforation 84 are located for any filmstrip length of an APS photographic element 70 consisting of media 34 supported on indexing drum 36 during operation of the station 240. Location 236 further represents the printing location on media 34 for printers 10 and 100 regardless of filmstrip length. It further represents the position where the indexing velocity of indexing drum 36 supporting media 34 is zero during the time in the perforation cycle when the punch 224 is engaged in the media 34.

A strip of photosensitive media 34 is converted to a useable format by adding perforations and edge printing. This may be done on a perforator/printer station of a web transport 240 as shown in FIG. 14. An example is the perforation 84 found on APS format photographic element 70 and shown in FIG. 2. The perforation 84 is provided adjacent to frame 0 72 on the film strip 70 and locates the position of frame 0 72 along the filmstrip. The intention of this apparatus is to provide capability to add two additional features to frame 0 72. These are a sensitometric exposure element array 76 consisting of a plurality of reference calibration patches 82 and a 2D barcode symbol array 74 consisting of an arrangement of 2 D barcode symbols 78. Both arrays 76 and 74 are arranged as shown in FIG. 2 within a second reserved area 80, located within frame 0 72.

The perforation of the filmstrip can be generated using an indexing, incremental motion perforator as is know in the art. A punch and die combination generates a perforation pattern in the film, such as media 34, by a series of incremental punching operations where the film is perforated to form a first set of perforations, the punches retract from engagement in the film, the film is indexed ahead to the next perforation position, the film forward velocity is reduced to zero, and the punches engage in the film to begin a new perforating cycle and form a second set of perforations adjacent to the first. The film is typically indexed to subsequent positions by a rotatable support device that engages the film in some manner. For example, using a nip roller or vacuum drum to generate a temporary attraction between the support device and film. A continuous series of perforations can be generated in this manner as well as a discontinuous series of perforations. An example of a discontinuous series of perforations is found on the APS filmstrip, well known in the art, where no perforations are present at the leader and trailer positions along the filmstrip.

The cycle of operation commences with the media 34 supported on the station 240 is first perforated by the punch 224 while the media is at rest during the dwell time between indexes. The punch 224 disengages the media 34 by the action of actuator 230 controlled by controller 134. Controller 134 then commands a servo indexing motor (not shown) attached to Indexing Drum 36 to rotate and transport the media 34 out of the perforator assembly 238 until frame 0 72 is located in position on the drum 36 that corresponds to location 236. Controller 134 commands the servo indexing motor rotation driving drum 36 to stop rotation and reduce the media 34 velocity to zero. The controller 134 then signals the controller 20 of printers 10 and 100 to begin operation while the media 34 is not in motion. The printing operation must subsequently complete during the dwell time between indexes, typically less than 100 msec. Controller 134 simultaneously signals the actuator 230 to begin a perforation cycle to generate a second series of perforations adjacent to the first on the same filmstrip. Alternatively the perforation cycle could be the start of a new filmstrip. Controller 20 operates subsystems 10 and 100 and then signals controller 134 when the printing operation is completed. Actuator 230 also signals controller 134 once the perforation cycle is complete. Controller 134 then completes the peroration cycle by commanding the indexing drum 36 servo motor to rotate the drum 36 transporting the media into the next perforation position.

The printing positional variation for printers 10 and 100 is generally a function of the highly accurate positioning capability of the drum 34 servo motor, resulting in accurate placement of arrays 74 and 76 within second reserved area 80. This setup results in a station 240 with the capability of printing to media 34 with highly accurate positioning, during a short (<100 msec) duration and with one printer 10 and 100 machine position that can accommodate all filmstrip lengths.

Figure 15:
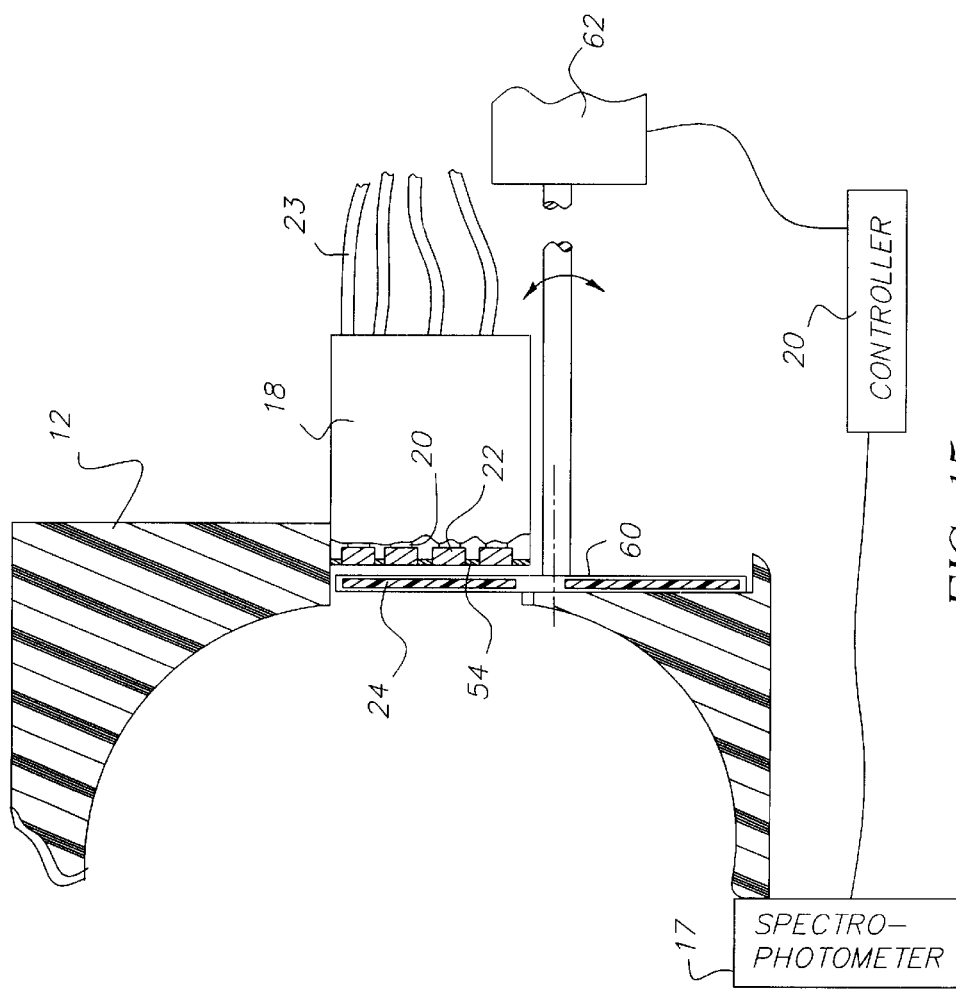
FIG. 15 is a partial view showing a moveable color temperature filter on the filter plug that could be moved automatically.

FIG. 15 is a partial view further describing the attenuation filter plug assembly 18 described in FIG. 5 and further illustrating an alternative apparatus that allows for automatic optical color correction filter adjustment in response to signals from controller 20. Light energy collected in the integrating sphere 12 passes into the filter plug assembly 18 through the optical color correction filter 24 located on one end of the plug body 19. The correction filter 24 is used to adjust the spectrum of light passed through to the individual attenuation filters 22 by attenuating particular undesirable wavelengths such that a desired color spectrum is achieved. This color corrected light then passes through the array of individual attenuation filters 22 and into fiber optics 23. It may be desirable to provide automatic adjustment of the correction filter 24 in response to changes in illumination color temperature measured by the spectrophotometer 17 inserted into integrating sphere 12 and analyzed by controller 20 as shown in FIG. 1. Color temperature may change for example due to typical aging characteristics of flashlamps 14 and 16 shown in FIG. 1. A rotatable color correction filter wheel 60 contains a plurality of correction filters 24 each with individual color correction characteristics interacting with the filter plug assembly as shown in FIG. 15. The wheel 60 is attached to the center shaft of rotatable motor 62 that is actuated by controller 20 in response to measurements from spectrophotometer 17. The wheel 60 places an individual color correction filter 24 in front of the of aperture mask 54 and individual optical attenuation filters 22 in the filter plug body 19 of plug assembly 18 as shown in FIG. 15 achieving the desired automatic adjustment of color temperature of the illumination from integrating sphere 12. This example illustrates one apparatus for achieving automatic color temperature correction, other arrangements are possible.

The invention has been described in detail with particular reference to certain preferred embodiments thereof, but it will be understood that variations and modifications can be effected within the spirit and scope of the invention.

PARTS LIST 10 reference calibration patch printer
12 integrating sphere
14 major output flash lamp
16 trimming output flash lamp
17 spectrophotometer
18 attenuation filter plug assembly
19 attenuation filter plug body
20 controller
22 individual optical attenuation filters
23 optical fibers
24 optical color correction filter
25 steps
26 projection printhead assembly
27 projection printhead body
28 projection printhead input baffle
30 projection printhead lens
31 projection printhead output chamber
32 projection printhead glare stop aperture
34 photosensitive medium
36 transport and indexing drum
38 exposure control optical fibers
40 exposure integrator circuit
42 major flash lamp power supply
43 trimming flash lamp power supply
48 antireflective surface
50 optical fiber bundle
52 retaining ring
54 aperture mask
60 color correction filter wheel
62 motor
70 APS format photographic element
72 frame 0
74 2D barcode data symbol array
76 reference calibration patch array
78 2D barcode symbols
80 second reserved area
82 reference calibration Patches
84 perforation
90 cover bearing
92 cover return spring
94 spring support
96 movable cover
97 cover actuator
98 transparent cover
100 data printer
108 illumination source 112 power supply
114 fiber optic bundle
116 housing
118 color correction filter
120 motor
124 condenser optics
125 video driver
126 light valve array
128 focusing optics
130 imaging position
132 control line
134 overall machine controller
136 photosensor A
138 photosensor B
140 analog integrator circuit A
142 analog integrator circuit B
144 analog to digital converter A
146 analog to digital converter B
148 non-volatile memory
150 digital control signal bus
152 digital data signal bus
154 temperature sensor
156 temperature controller
158 heater
160 heatsink
162–196 operational sequence flow chart steps
200 pressurized air source
202 delivery tube
204 delivery channel
206 air flow path
220 suction chamber
222 exhaust pipe
224 perforator punch
226 movable perforator punch support
228 actuator link
230 actuator
232 fixed perforator die
234 idler roller
236 perforator/printer station common exposure location
238 perforator assembly
240 perforator/printer station of a web transport

What is claimed is:

1. Apparatus for exposing a reference calibration patch onto photosensitive medium, the reference calibration patch including a plurality of exposed elements, comprising:
   a) a light source;
   b) a plurality of optical fibers, one fiber for each element to be exposed;
   c) a light collector having an input port for receiving light emitted by the light source and an output port for delivering light to one end of the optical fibers;
   d) a plurality of light attenuators located with respect to the optical fiber for individually attenuating the light transmitted by each fiber;
   e) a projection print head located at the other end of the optical fibers for directing light from the fibers onto the photosensitive medium; and
   f) a controller connected to the light source for measuring and controlling the light output of the light collector.

2. The apparatus claimed in 1, wherein the controller is connected to the light source by a plurality of optical fibers, and includes a corresponding plurality of redundant light measuring elements and a temperature compensation element for detecting the temperature of the light measuring elements and compensating their output for temperature.

3. The apparatus claimed in claim 1, wherein the light source includes a plurality of flash lamps.

4. The apparatus claimed in claim 3, wherein the flash lamps include a main flash lamp for providing a major portion of the exposure and a trimming flash lamp for finely adjusting the exposure.

5. The apparatus claimed in claim 1, wherein the print head includes, for each fiber, a light baffle portion, a lens for focusing the end of the fiber onto the medium and a glare stop to reduce flare between reference calibration patches.

6. The apparatus claimed in claim 5, wherein the glare stop and lenses include an antireflection coating and the print head includes grooves to reduce reflection from other optical hardware and the photosensitive medium.

7. The apparatus claimed in claim 5 wherein the projection print head includes a space between the lens and the glare stop and further comprises a source of pressurized air connected to the space and exhausting through the glare stop.

8. The apparatus claimed in claim 5 wherein the lenses and the optical fibers are configured to produce a substantially flat peak profile.

9. The apparatus described in claim 5 wherein the photosensitive medium is on a curved surface, and wherein the optical fibers, light baffles, lenses and glare stops are arranged in the printhead normal to the curved surface and at equal distances therefrom to provide a consistent focus distance for each data element.

10. The apparatus claimed in claim 1 further comprising a transparent cap covering the end of the projection print head.

11. The apparatus claimed in claim 1 further comprising a removable cover for covering the end of the projection print head when not in use.

12. The apparatus claimed in claim 1, wherein the controller operates the light source to produce a plurality of relatively large pulses of light to build up the exposure to less than a desired predetermined amount, and a plurality of relatively smaller pulses of light to complete the exposure to the predetermined amount.

13. The apparatus claimed in claim 12, wherein the light source includes a plurality of flash lamps for providing the relatively large and smaller pulses of light respectively.

14. The apparatus claimed in claim 1 where the light source is a flash lamp with a quenched driver.

15. The apparatus claimed in claim 1, further comprising an automatic color temperature correction filter and a spectra-photometer located in the light collector for monitoring the color temperature of the light in the light collector and providing feedback to control the automatic color temperature correction filter.

16. The apparatus claimed in claim 1, further comprising a spectra-photometer located in the light collector for monitoring the color temperature of the light in the light collector and providing a signal to indicate a color temperature shift.

17. The apparatus claimed in claim 1, further incorporating a data printer comprising:
   a) a second light source;
   b) a two dimensional liquid crystal light modulator for modulating the light from the second light source;
   c) optics for projecting an image of the light modulator onto the photosensitive medium; and
   d) the controller being connected to the light modulator and the second light source for applying a two dimensional bar code image signal to the light modulator and activating the second light source for exposing the two dimensional bar code onto the photosensitive medium.

18. The apparatus claimed in claim 17, further comprising a memory connected to the controller for storing correction factors for the reference calibration patches exposed onto the photosensitive medium and the controller including means for generating two dimensional bar code symbol based on the correction factors.

19. The apparatus claimed in claim 18 wherein the correction factors represent offsets between desired sensitometric data element values and actual sensitometric data element values as measured relative to an established standard to fully define the film characteristic at time of manufacture.

20. The apparatus claimed in claim 17, wherein the photosensitive medium is photographic film and the apparatus is mounted on a film transport of a film manufacturing apparatus.

21. The apparatus claimed in 20 wherein the film manufacturing apparatus is a perforating/printing station whereby precise placement of the reference calibration patches and 2D barcodes relative to the film perforations is achieved.

22. The apparatus claimed in 21 where the controller is connected to and synchronized with a controller of the perforating/printing station such that automatic machine setups when changing product types are enabled, thereby minimizing manufacturing downtime and need for operator intervention.

23. The apparatus claimed in 22 wherein the perforating/printing station intermittently slows or stops the photosensitive medium, and the controller causes exposures to be made when the film strip is slowed or stopped.

24. The apparatus claimed in claim 23, wherein the perforation/printing station includes a location where a predetermined frame stops, regardless of film length, wherein the apparatus is at this location.

25. The apparatus claimed in claim 1, wherein the light collector is an integrating sphere.

26. A method for exposing reference calibration patch onto photosensitive medium, the reference calibration patch having a plurality of exposed elements, comprising the steps of:
   a) providing a light source having a plurality of flash lamps;
   b) providing a plurality of optical fibers, one fiber for each element to be exposed;
   c) providing a light collector having an input port for receiving light emitted by the light source and an output port for delivering light to one end of the optical fibers;
   d) providing a plurality of light attenuators located with respect to the optical fiber for individually attenuating the light transmitted by each fiber;
   e) providing a projection print head located at the other end of the optical fibers for directing light from the fibers onto the photosensitive medium; and
   f) measuring the light output of the light collector and controlling the light source to expose the reference calibration patches.

27. The method claimed in 26, wherein the light output is measured by light sensing elements, and further comprising the step of measuring a temperature of the light sensing elements and compensating their output for temperature.

28. The method claimed in claim 27, wherein the light sensing elements are made by different manufacturers.

29. The method claimed in claim 26, wherein the flash lamps include a main flash lamp and a trimming flash lamp, and including the steps of actuating the main flash lamp to provide a main exposure and actuating the trimming flash lamp for finely adjusting the main exposure.

30. The method claimed in claim 26, wherein the print head includes, for each fiber, a light baffle portion, a lens for focusing the end of the fiber onto the medium and a glare stop to reduce flare between reference calibration patches.

31. The method claimed in claim 30, wherein the glare stop and lenses include an antireflection coating and the print head includes grooves to reduce reflection from other optical hardware and the photosensitive.

32. The method claimed in claim 30 wherein the projection print head includes a space between the lens and the glare stop and further comprises a source of pressurized air connected to the space and exhausting through the glare stop.

33. The method claimed in claim 30, wherein the lenses and the optical fibers are configured to produce a substantially flat peak profile.

34. The method described in claim 30, wherein the photosensitive medium is on a curved surface, and wherein the optical fibers, light baffles, lenses and glare stops are arranged in the printhead normal to the curved surface and at equal distances therefrom to provide a consistent focus distance for each data element.

35. The method claimed in claim 26 wherein the projection print head includes a transparent cap.

36. The method claimed in claim 26 wherein the projection print head further includes a removable cover for covering the end of the projection print head when not in use.

37. The method claimed in claim 26, further comprising the steps of operating the light source to produce a plurality of relatively large pulses of light to build up the exposure to less than a desired predetermined amount, and a plurality of relatively smaller pulses of light to complete the exposure to the predetermined amount.

38. The method claimed in claim 26 where the flash lamps each include a quenched driver.

39. The method claimed in claim 26, further comprising the step of providing an automatic color temperature correction filter and a spectra-photometer located in the light collector for monitoring the color temperature of the light in the light collector and providing feedback to control the automatic color temperature correction filter.

40. The method claimed in claim 26, further comprising the step of providing a spectra-photometer located in the light collector for monitoring the color temperature of the light in the light collector to produce a signal to indicate a color temperature shift, and manually adjust the apparatus in response to the signal.

41. The method claimed in claim 26, further comprising the steps of:
   a) providing a data printer including:
      i) a second light source;
      ii) a two dimensional liquid crystal light modulator for modulating the light from the second light source;
      iii) optics for projecting an image of the light modulator onto the photosensitive medium; and
      iv) the controller being connected to the light modulator and the second light source for applying a two dimensional bar code image signal to the light modulator and activating the second light source for exposing the two dimensional bar code onto the photosensitive medium; and
   b) printing a two dimensional bar code symbol with the data printer.

42. The method claimed in claim 41, further comprising a memory connected to the controller for storing correction factors for the reference calibration patches exposed onto the photosensitive medium and the controller including the step of generating two dimensional bar code symbols based on the correction factors.

43. The method claimed in claim 42, wherein the correction factors represent the offsets between desired sensitometric data element values and actual sensitometric data element values as measured relative to an established standard to fully define the film characteristic at time of manufacture.

44. The method claimed in claim 41, wherein the photosensitive medium is photographic film and wherein the projection print head and data printer are mounted on a film transport of a film manufacturing apparatus.

45. The method claimed in claim 44, wherein the film manufacturing apparatus is a perforating/printing station whereby precise placement of the reference calibration patches and 2D barcodes relative to the film perforations is achieved.

46. The method claimed in 45, further comprising the step of synchronizing the exposing and printing with the operation of the perforating/printing station such that automatic machine setups when changing product types are enabled, thereby minimizing manufacturing downtime and need for operator intervention.

47. The method claimed in 46, wherein the perforating/printing station intermittently slows or stops the photosensitive medium, and the exposures are made when the film strip is slowed or stopped.

48. The method claimed in claim 47, wherein the perforation/printing station includes a location where a predetermined frame stops, regardless of film length, and wherein the projection print head and data printer are at this location.

49. The method claimed in claim 26, wherein the light collector is an integrating sphere.

* * * * *